A. H. FREE.
Balance Scales.
No. 562.
Patented Jan'y 9, 1838.
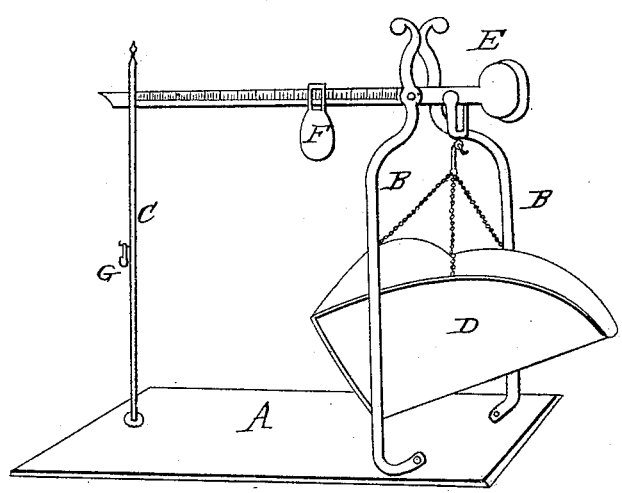

UNITED STATES PATENT OFFICE.

A. H. TREE, OF TROY, NEW YORK.

SCALE BEAM AND WEIGHT.

Specification of Letters Patent No. 562, dated January 9, 1838.

*To all whom it may concern:*

Be it known that I, ALVAH H. TREE, of the city of Troy, in the county of Rensselaer and State of New York, have invented a new and useful Improvement in Scales or in a Machine for Weighing, and that the following is a full and exact description of the construction and operation of the said scales or machine for weighing and of what parts thereof I claim as my invention or discovery viz:

First. In the annexed drawing A is intended to represent a platform to which all the rest of the machinery hereafter described is affixed which may be made of cast-iron or timber and which may be varied in length or width according to the use the scales may be put to or the place the same may occupy; the platform may also be made stationary or movable according to convenience.

Second. In the annexed drawing B B are intended to represent two iron supporters at the foreparts of the scale beam placed at such a distance apart at the bottom as to furnish room for the receiver of the materials to be weighed and by being curved approaching near enough at the place where the scale beam passes between said supporters to furnish just room enough for the thickness of the scale beam and to leave its vibrating motion unobstructed by any friction on the sides of the beams at the points wher ethe beam passes between these supporters is placed the fulcrum of the scales and the top of the supporters is fastened together to make the scales steady and firm. The objects and use of these supporters is to create the fulcrum of the scales.

Third. In the annexed drawing the part marked C is intended to represent an upright iron supporter at the back end of the scale beam and through which it passes the use of which is to steady the scale beam and to limit its motion up and down, the opening in said upright supporter is to be made large enough to give room for the motion of the scale beam up and downwards and to avoid lateral friction.

Fourth. In the annexed drawing the part marked D represents a receiver of sheet iron or tin (into which is to be put or placed what is to be weighed) suspended by three chains uniting in one which are attached to an iron or steel loop, in the upper ends of which loop are made eyes into which eyes pass pins from the scale beam. The pins are made of steel and are fastened into the scale beam forming pivots in the manner of the ordinary steel-yards within said eyes.

Fifth. In the annexed drawing the part marked E represents a scale beam to be made of steel iron or brass, graduated on both sides along the upper edge as fine as the delicacy of the scales require. The beam is not notched but perfectly straight even or smooth on the upper edge with the sides perpendicularly or beveling towards the upper edge as convenience may require. There are steel pins to be inserted into each side of the scale beam at the fulcrum and at the point where the weight is suspended. These pins at the fulcrum are almost brought to an edge by a short bevel on the lower side where they rest and are upheld in eyes fixed in the curved supporters above named and described, and the pins when the weight is suspended are brought almost to an edge by a short bevel on the upper side which pins are to play or move in the eyes fixed in the upper end of the above described loop thus forming pivots at the fulcrum and at the points of the suspension of the above described receiver. The beam is to be so constructed that by having the poise placed at the nearest point it may be to the fulcrum it shall balance and it may be graduated from that point to the other extreme to the fineness of grains.

Sixth. In the annexed drawing the part marked F represents a poise which has an opening through the upper part of it through which passes the scale beam or through which it is slided upon the scale beam—the parts of which poise which rests on the upper surface of the scale beam is to be wrought by a short bevel nearly to an edge forming a pivot on the scale beam so that it shall not obstruct the motion of the scale beam or affect the delicacy of the scales on each side of said poise is to be made an index placed in an opening either proceeding from the upper part of the poise pointing downwards or from the lower part of the poise pointing upwards for the purpose designating or pointing out the weight on the graduated scale beam.

Seventh. C is intended to represent a small poise to be used as a balance at the extremity of the scale beam to balance a dish or anything else that may be placed in the receiver before the substance whose weight is to be ascertained is put into the dish and receiver.

The foregoing is a description of the entire scales or weighing machine. But I claim the following as my invention or discovery.

I claim as my invention and desire to secure by Letters Patent—

The making the upper edge of the scale beam on which poise a weight hangs, smooth and even and combining therewith a poise having a pointer or pointers as herein described.

ALVAH H. TREE.

Witnesses:
  H. Z. HAYNES,
  JOB S. OLIN.